March 5, 1963  S. G. BAIR ETAL  3,080,200
JOURNAL LUBRICATING DEVICE
Filed July 14, 1959  2 Sheets-Sheet 1

INVENTORS
Stanley G. Bair
JOHN T. HAGY
BY Diggins & Le Blanc
ATTORNEYS

March 5, 1963 S. G. BAIR ETAL 3,080,200
JOURNAL LUBRICATING DEVICE
Filed July 14, 1959 2 Sheets-Sheet 2

INVENTORS
Stanley G. Bair
JOHN T. HAGY
BY *Diggins & LeBlanc*
ATTORNEYS

United States Patent Office 3,080,200
Patented Mar. 5, 1963

---

3,080,200
JOURNAL LUBRICATING DEVICE
Stanley G. Bair, Chicago, Ill., and John T. Hagy, Pittsburgh, Pa., assignors to The Journapak Corporation, New York, N.Y., a corporation of Delaware
Filed July 14, 1959, Ser. No. 827,076
2 Claims. (Cl. 308—243)

This invention relates to lubricating devices for the journal bearings of railway cars and other similar journal bearings, and more particularly to pad type lubricators having elastic or resilient cores for holding the lubricator in contact with the surface of a journal.

Both the occurrence and the seriousness of the well-known "hot boxes" caused by over-heating of journal bearings have increased in recent years along with the substantial increase in the speed of trains as well as the size and weight of the cars and the loads which they carry. A major factor involved in the overheating of journal bearings is inefficient or insufficient application of lubricating oil to the bearing surfaces under widely varying conditions.

An important source of difficulty with the previously known lubricating devices has been their tendency to become distorted and to become bunched when subjected to impact as in sudden starts or stops as well as in turning when the journal is displaced as much as several inches relative to the journal box. This displacement distorts the packing and causes it to bunch unevenly on one side of the journal box so that the rotating journal may sweep up portions of the packing and compact it against the journal brass. As a result, the bearing is cut off from the supply of oil to a greater or less degree.

Even when a journal lubricator is in its normal position excessive heating may be caused by high pressure and resulting high friction between the journal and the lubricator. Even though the friction between the journal and the lubricator may be relatively low as compared with the friction between the journal and journal brass, the small amount of additional heat may be enough to cause a serious "hot box." It is important, therefore, that a satisfactory journal lubricator conform, to some extent at least, to the configuration of the journal and journal box to avoid excessive pressure between the journal and journal lubricator.

For many years railway journal boxes were packed with waste, but in recent years, waste has been largely replaced by lubricator pads which, while an improvement on waste, have themselves presented a two-fold problem. First, of course, is the problem of conveying a sufficient amount of lubricant to the journal and, second, the avoiding of excessive friction between the journal and lubricator while maintaining the journal lubricator in proper position within the box. Both conditions are necessary to give adequate lubrication at all times.

It is apparent that the friction between the journal and the journal lubricator will substantially increase if there is insufficient lubricant between the journal and the journal contacting surface of the lubricator. That is to say, if the lubricator is so constructed that dry spots may develop on the journal contacting surface, these dry spots will be friction rather than lubricating surfaces. The resulting friction and heat evolved will be proportional to the pressure between the journal and lubricator at the dry spot.

The bottom of the journal frequently is a relatively high pressure point so far as the lubricator is concerned and for this reason it is highly important to secure an adequate flow of lubricant and complete saturation of the journal contacting surface of the lubricator with lubricant at and along the bottom portion of the journal.

Heretofore, many efforts have been made to provide a satisfactory lubricator for journal boxes but none of the previous has fully and completely met all of the various requirements in a completely satisfactory manner.

Successful lubricators have been made in the form of a pad of rectangular cross section but when such a pad is inserted into a box in contact with a cylindrical journal, the pressure between the journal and the pad, necessary to conform the pad to the journal, may become relatively high.

Pads have been made with two parallel pockets so that the pockets may pivot to a V-shape and thus conform more easily to the contour of the journal. Numerous such pads are now on the market and operate with some degree of satisfaction.

Pads have also been made with three or more parallel pockets thus enabling them to conform even more closely to the cylindrical contour of the journal, but under some circumstances, these multipocket pads may have an inadequate supply of lubrication along the vertical center lines of the journal. Hence, these pads may develop dry spots, which, in turn, result in increased friction, increased heat and possible hot boxes. Pad type journal lubricating devices accepted for use by the Association of American Railroads are listed in the A.A.R. Lubrication Manual of standard and recommended practice effective March 1, 1956. These accepted devices include examples of the single, double and multiple pocket pads discussed above.

I have found that the advantages of the rectangular pad, the two pocket pad and three pocket pad may all be retained, and the disadvantages of each minimized by providing a pad having the deformability of a three pocket pad while providing a very substantial oil feed along the vertical center line of the journal. Thus, it is possible to obtain conformity to the cylindrical journal surface in a manner superior to that of the rectangular and two pocket pad while, at the same time, avoiding or minimizing the possible failure of lubrication along the vertical line which may result especially from the use of a single or three pocket pad.

This advantageous result is accomplished through the provision of a modified four pocket type lubricator incorporating center feed pile fabric extending lengthwise of the middle or center pocket and which fabric passes completely through the pad to provide a plurality of capillary paths through the center pocket from the bottom or lowermost portion of the journal box directly to the central area of the journal. In addition to substantially improving the overall lubricating action of the journal pad, novel means are provided to rigidly secure the two central resilient cores against movement relative to the surrounding casing or jacket which encloses them.

It is therefore a primary object of the present invention to provide a novel lubricating device for journal bearings.

Another object of the present invention is to provide a lubricating pad including means for securely positioning the lubricator in a journal box.

Another object of the present invention is to provide an improved four pocket type lubricator including center feed capillary means for raising oil to the journal from the lowermost portions of a journal box.

Still another object of the present invention is to provide a lubricator including means for securely retaining the resilient cores within their surrounding jacket.

These and further objects and advantages of the invention will become more apparent upon reference to the following specification claims and appended drawings wherein:

Figure 1:
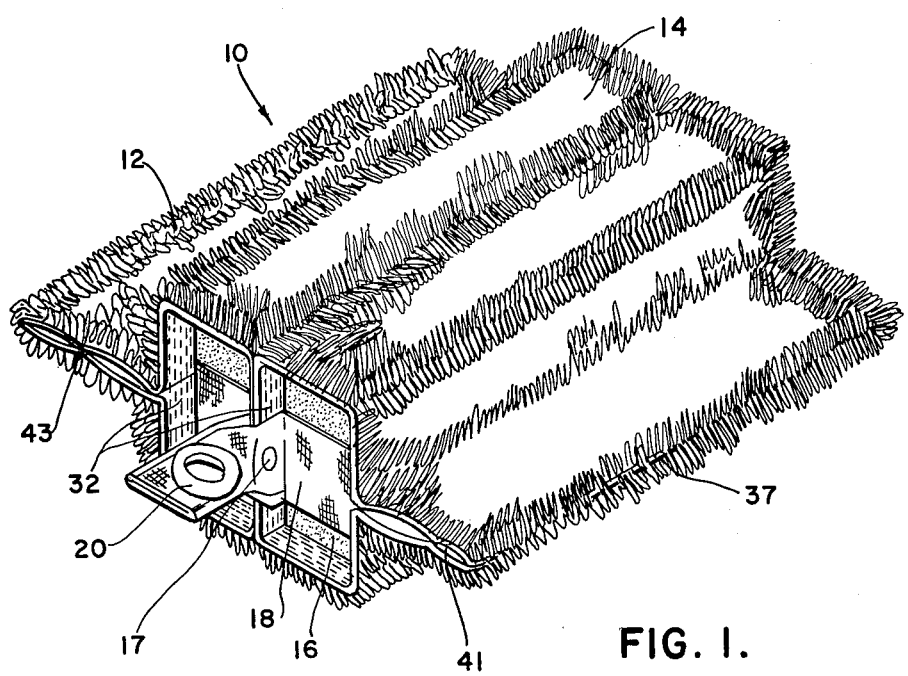
FIGURE 1 is a perspective view of the novel lubricating device of the present invention.

Referring to the drawings the lubricator of the present invention generally indicated at 10 comprises a two piece outer casing or jacket 12 having a pile or napped outer surface 14. Received within jacket 12 are a plurality of resilient sponge-like cores, one of which is indicated in FIGURE 1 at 16. Secured to jacket 12 by two rivets as seen at 17 and 19 in FIGURE 5 is a pull tape 18 including an eyelet or grommet 20 by which the lubricator may be readily inserted in and removed from a journal box.

Jacket 12 may be constructed of a strong and durable permeable textile fabric such as canvas or the like and includes an outer loop pile or nap surface of relatively heavy gauge chenile. While less suitable, cotton pile fabric may also be employed. The nap surface 14 preferably consists of a large number of closely spaced loops standing away from jacket 12 approximately ½ to one inch over the entire outer surface of the jacket. Each of the cores may be made of any suitable resilient oil resistant material such as hycar or sponge plastic, for example neoprene foam. The cores are preferably constrained under slight compression in the corresponding pockets formed by the inner surfaces of jacket 12. These cores are chemically stable, have good heat resistance, are resistant to deterioration under the influence of oil and have a low compression set.

Figure 6:
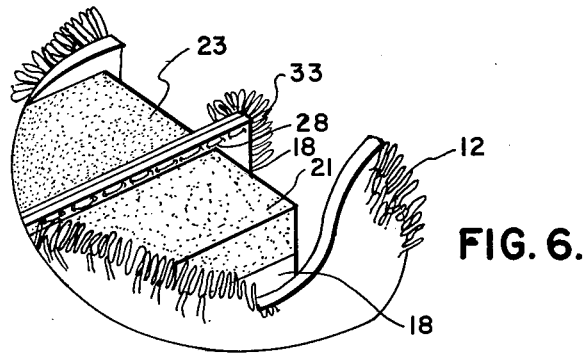
FIGURE 6 is a partially cut away view of the rear edge of the lubricating device of FIGURE 1.
Figures 2, 4:
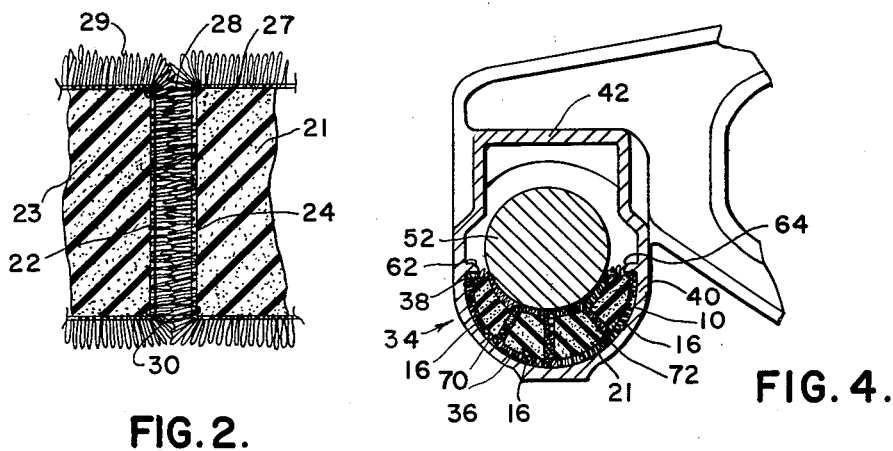
FIGURE 2 is a partial cross section through the two central pockets of FIGURE 1.
FIGURE 4 is a vertical cross section through a journal box incorporating a lubricating device according to the present invention.

FIGURE 2 shows the two central cores labeled 21 and 23 in FIGURES 2 and 6 which are held in position by surrounding pull tape 18 in conjunction with the pockets formed by casing 12. Passing between cores 21 and 23 are two rows of center feed yarns 22 and 24 on adjacent vertical central portions of jacket 12 as best seen in FIGURE 2 extending entirely through the central portion of the lubricator. As is clearly shown in FIGURE 2 center feed yarns 22 and 24 are continuations of the napped surface of the two piece jacket 12. One half 27 of the jacket encloses central core 21 and right hand core 31 shown in FIGURE 3 while the other half 29 of the jacket surrounds central core 23 and the left hand core. The two pieces of the jacket are stitched together along the top and bottom of the entire length of the central cores as indicated at 28 and 30 in FIGURE 2. FIGURE 6 shows the top line of stitching 28 extending almost to the extreme upper rear edge of the lubricator. The lower line of stitching extends similarly along the bottom of the lubricator.

Figure 5:
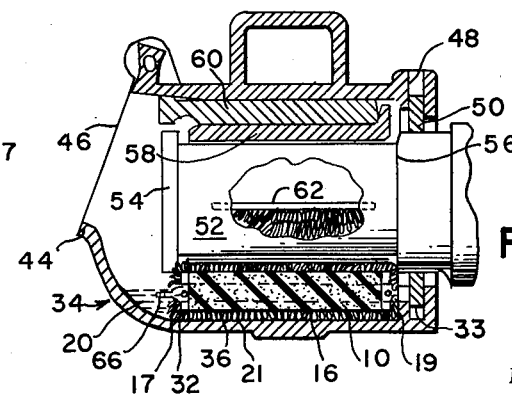
FIGURE 5 is a vertical section through a journal box taken at right angles to the section of FIGURE 4.

A portion of each half of jacket 12 extends beyond the end of the central cores as indicated at 32 in FIGURES 1 and 5. These outwardly extending portions are joined together and to the pull tape 18 by the rivet 17 previously described. The extreme ends of the pull tape are then properly shaped, sewn together and then pierced by the grommet 20. Similar extensions beyond the rear of central cores 21 and 23 as indicated at 33 in FIGURES 5 and 6 are joined together and to the pull tape by rivet 19. The pull tape 18 in surrounding each of the central cores on three sides thus forms in conjunction with the center feed pile portions 22 and 24 of the jacket a pair of closed horizontal loops serving to securely retain the cores in the two central pockets of the lubricator against excessive movement and preferably under slight compression. Overhanging portions 32 and 33 of jacket 12 at the front and rear of the lubricator are preferably made large enough so as to exhibit a certain amount of flexibility and tend to turn over and close off the front and rear ends of the lubricator much in the manner of the two side pockets shown in FIGURE 1. However, for the purpose of illustrating the central cores and jacket stitching they are shown in the drawings as extending substantially straight out.

Figure 3:
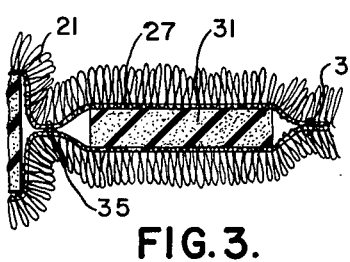
FIGURE 3 is a vertical cross section through one of the side pockets of the lubricator of FIGURE 1.

The end cores, one of which is shown at 31 in FIGURE 3 are similarly retained by the respective halves 27 and 29 of the jacket. As shown jacket half 27 is stitched along the entire length of the cores at 35 on one side of core 31 and along the extreme outer edge of the lubricator as indicated at 37. The front and rear ends of the side pockets are preferably sewn so as to be almost closed as indicated at 41 and 43 in FIGURE 1.

As can be seen, center feed loops 22 and 24 provide a plurality of looped pile fabric capillary paths from the central and lowermost portion of the lubricator directly to the center of the journal which in cooperation with the pumping action occasioned by movement of the journal against the resilient lubricator serves to supply center feed oil to the journal. The jacketing material holding loops 22 and 24 also provides means in conjunction with the surrounding pull tape for securely fastening each central core against movement within its enclosing pocket formed by jacket 12 and enclosing pull tape 18.

FIGURES 4 and 5 show in section the lubricator 10 incorporated in a journal box and positioned beneath the journal to supply lubricant to the bearing surfaces. The journal box indicated at 34 comprises a bottom wall 36, side walls 38 and 40 and a top wall 42. Journal box 34 also includes a front wall 44 having an opening 46 providing access to the interior of the journal box. At the rear of the journal box is the conventional dust guard well 48 including a dust guard 50 engaging a railway car axle journal 52. Intermediate the outer flange or collar 54 and fillet 56 of the journal adjacent its upper surface is the journal bearing or brass 58 and wedge 60.

The interior surfaces of side walls 38 and 40 are formed with elongated ribs 62 and 64 which extend over a major portion of the length of the journal box adjacent journal 52. Received between the ribs 62 and 64 and extending downwardly below the journal between the collar and fillet is the lubricator 10 of the present invention. Lubricator 10 is partially submerged in a reservoir of oil or other suitable lubricant filling the bottom of the journal box as indicated at 66 in FIGURE 5.

The parallel center feed jacket strips with loops 22 and 24 extend completely through the lubricator 10 into the oil reservoir 66 and upwardly between the cores to the lower side of journal 52. Loops 22 and 24 of the nap surface of the lubricator commingle and cooperate with the resilient cores and covering jacket to provide a short, direct path for lubricant to the central area of the journal. The abutment of the edges of lubricator 10 with journal box ribs 62 and 64 acts to securely maintain the lubricator in the proper position within the journal box so that the pad will not move with respect to the journal and tend to cause waste grab with the accompanying reduction in supply of lubricant to the bearing surfaces.

While the jacket 12 may be formed of any desired number of pieces, it is preferably constructed of two pieces as shown. The right and left hand pieces thereof extend between the center cores and are sewn together as indictaed at 35 in FIGURE 3 between each center core and the end core such as core 31. The jacket pieces are also sewn completely across each end as indicated at 37. The adjacent nap surfaces intermediate the center cores and the end cores provide additional lubricant flow paths for the transfer of oil from the bottom of the journal box to the surface of the journal. It will be noted, however, that when the oil reservoir drops below a certain level, the nap surfaces intermediates the center cores and the end cores are incapable of supplying oil to the journal and only center feed loops 22 and 24 remain in direct capillary contact with the oil reservoir to supply oil to the journal. This is particularly important in modern high speed trains wherein substantial distances are traveled without any stops during which the oil may be replenished. The center feed loops prevent hot boxes while there is still some oil or other suitable lubricant remaining in the bottom of the journal box.

It is apparent that the present invention provides a novel lubricator device incorporating desirable features of several of the known resilient pocket type lubricator pads including center feed means for supplying lubricant from the lowermost portion of a journal box directly to the journal surface without many of the accompanying disadvantages of each of the known pads. In addition to the superior lubricating action provided by the device of the present invention, novel means are further provided for securely fixing the lubricator within a journal box and assuring that relative movement between the two central cores and the lubricator jacket will not be brought about as the journal is moved about in the journal box when the railway car is jarred. In operation, oil is stored under pressure in the box with the cores and surrounding jacket material impregnated with lubricant which is constantly fed to the journal by capillary action of the yarn and nap surfaces as supplemented by the pumping action occasioned by relative motion between the journal and journal box. Oil is applied to the journal during its rotation in either direction by a continuous absorbant soft pile surface formed by the upper portion of the lubricator jacket and direct capillary oil supply to the center of the journal is assured by center feed pile loops 22 and 24 even at such times as when the oil reservoir at the bottom of the journal box becomes quite low.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lubricator for railway car journals adapted to be placed in a journal box adjacent the underside of a journal between the journal collar and fillet comprising a fabric jacket forming a pair of central elongated pockets and an adjacent elongated pocket on each side of and parallel to said central pockets, said jacket being formed with a napped outer surface, a resilient core received in each of said pockets for resiliently urging said napped surface against the underside of a journal, said core enclosing pockets being of sufficient size to substantially fill the lower portion of a ribbed journal box between the ribs thereof, the napped surfaced of said jacket intermediate said cores forming spaced lubricating passages on opposite sides of a vertical plane through the axis of a journal when said lubricator is positioned in a journal box, and having a portion of said jacket and napped surface passing completely through the middle of the lubricator between said central pockets whereby the napped surface of said jacket portion provides a direct capillary lubricant path from the central bottom portion of said lubricator to the central underside of a journal, said centerfeed napped surface forming two parallel comingled loop surfaces splitting said jacket into two parts, said loops extending from adjacent the front edge of said central pockets to adjacent the rear edge of said central pockets, said jacket being formed of two peices with adjacent parallel portions of each piece passing between said central cores and sewn together at the top and bottom of said parallel portions from the front to the rear edge of said central pockets, and a pull tape fastened at the front and rear edges of said central pockets to the inner surface of said jacket portions separating said central cores, said pull tape passing around the central cores in said central pockets and joined at the front of said lubricator to form a handle for adjusting said lubricator in a journal box.

2. A lubricator for railway car journals adapted to be placed in a journal box adjacent to the underside of a journal between the journal collar and fillet comprising a fabric jacket forming a pair of central elongated pockets and an adjacent elongated pocket on each side of and parallel to said central pockets, said jacket being formed with a napped outer surface, a resileint core received in each of said pockets for resiliently urging said napped surface against the underside of a journal, said core enclosing pockets being of sufficient size to substantially fill the lower portion of a ribbed journal box between the ribs thereof, the napped surface of said jacket intermediate said cores forming spaced lubricating passages on opposite sides of a vertical plane through the axis of a journal when said lubricator is positioned in a journal box, and having a portion of said jacket and napped surface passing completely through the middle of the lubricator between said central pockets whereby the napped surface of said jacket portion provides a direct capillary lubricant path from the central bottom portion of said lubricator to the central underside of a journal, said centerfeed napped surface forming two parallel commingled loop surfaces splitting said jacket into two parts, said loops extending from adjacent the front edge of said central pockets to adjacent the rear edge of said central pockets, and said jacket being formed of two pieces with adjacent parallel portions of each piece passing between said central cores and sewn together at the top and the bottom of said parallel portions from the front to the rear edge of said central pockets.

References Cited in the file of this patent

UNITED STATES PATENTS

| 2,150,935 | Miller | Mar. 21, 1939 |
| 2,807,803 | Rockwell | Sept. 24, 1957 |
| 2,927,828 | Harkenrider | Mar. 8, 1960 |
| 2,991,134 | Harkenrider | July 4, 1961 |
| 2,991,135 | Harkenrider | July 4, 1961 |

FOREIGN PATENTS

| 208,573 | Australia | June 6, 1957 |

UNITED STATES PATENT OFFICE
CERTIFICATE OF CORRECTION

Patent No. 3,080,200              March 5, 1963

Stanley G. Bair

It is hereby certified that error appears in the above numbered patent requiring correction and that the said Letters Patent should read as corrected below.

Column 2, line 20, for "lines" read -- line --; line 38, after "vertical" insert -- center --; column 4, lines 63 and 64, for "indictaed" read -- indicated --; line 73, for "intermediates" read -- intermediate --; column 6, line 10, for "peices" read -- pieces --; line 26, for "resileint" read -- resilient --.

Signed and sealed this 24th day of September 1963.

(SEAL)
Attest:

ERNEST W. SWIDER
Attesting Officer

DAVID L. LADD
Commissioner of Patents